(12) United States Patent
Asthana et al.

(10) Patent No.: US 9,760,818 B2
(45) Date of Patent: Sep. 12, 2017

(54) MACHINE-READABLE WATERMARKS AND BARCODES IN IMAGES

(71) Applicant: Hewlett-Packard Development Company, L.P., Houston, TX (US)

(72) Inventors: Prashant Asthana, Bangalore (IN); Adarsh Thimmappa, Mysore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/307,153

(22) PCT Filed: Jan. 20, 2015

(86) PCT No.: PCT/US2015/012041
§ 371 (c)(1),
(2) Date: Oct. 27, 2016

(87) PCT Pub. No.: WO2015/167628
PCT Pub. Date: Nov. 5, 2015

(65) Prior Publication Data
US 2017/0046605 A1 Feb. 16, 2017

(30) Foreign Application Priority Data

Apr. 29, 2014 (IN) .......................... 2172/CHE/2014

(51) Int. Cl.
*G06K 7/10* (2006.01)
*G06K 19/06* (2006.01)
*G06K 7/14* (2006.01)

(52) U.S. Cl.
CPC ..... *G06K 19/06037* (2013.01); *G06K 7/1417* (2013.01)

(58) Field of Classification Search
USPC .............. 235/383, 457, 462.01, 462.09, 494
See application file for complete search history.

(56) References Cited

U.S. PATENT DOCUMENTS 6,970,573 B2 * 11/2005 Carr ..................... B42D 25/313
283/72
7,387,249 B2 * 6/2008 Hudson ............ G06K 19/06028
235/384

(Continued)

FOREIGN PATENT DOCUMENTS

CN 103077495 A 5/2013
EP 1333658 8/2003

(Continued)

OTHER PUBLICATIONS

Chen et al., "Identification Recovery Scheme using Quick Response (QR) Code and Watermarking Technique," Appl. Math. Inf. Sci. 8, No. 2, 585-596 (2014).

(Continued)

*Primary Examiner* — Tuyen K Vo
(74) *Attorney, Agent, or Firm* — HP Inc. Patent Department (57) ABSTRACT

Example embodiments relate to recognizing embedded information from images. In this manner, the embodiments disclosed herein enable recognition of a first barcode from a first image and a first machine-readable watermark based on the first barcode. The first barcode may be decoded to obtain a first group identifier. The first machine-readable watermark may also be decoded. A first payload associated with the first machine-readable watermark may be accessed based on the first group identifier and a first reusable watermark identifier of the first machine-readable watermark.

20 Claims, 8 Drawing Sheets

(56) References Cited

U.S. PATENT DOCUMENTS

| | | | |
|---|---|---|---|
| 8,126,202 B2 | 2/2012 | Nakamura et al. | |
| 8,565,815 B2 | 10/2013 | Rhoads et al. | |
| 8,620,772 B2 | 12/2013 | Owen | |
| 2001/0037455 A1* | 11/2001 | Lawandy | G06K 7/12 713/176 |
| 2003/0128862 A1* | 7/2003 | Decker | B42D 25/29 382/100 |
| 2003/0147549 A1* | 8/2003 | Choi | G06T 1/0021 382/100 |
| 2004/0060976 A1* | 4/2004 | Blazey | G06K 19/08 235/375 |
| 2005/0063027 A1* | 3/2005 | Durst, Jr. | G06K 7/1417 359/2 |
| 2005/0067487 A1* | 3/2005 | Brundage | G06K 19/16 235/380 |
| 2005/0169496 A1* | 8/2005 | Perry | G06F 21/10 382/100 |
| 2005/0271246 A1* | 12/2005 | Sharma | G06Q 20/3823 382/100 |
| 2006/0018507 A1* | 1/2006 | Rodriguez | G06T 1/0064 382/100 |
| 2006/0023913 A1 | 2/2006 | Muratani | |
| 2012/0124388 A1 | 5/2012 | Chng et al. | |
| 2012/0275641 A1* | 11/2012 | Al-Omari | G06T 1/0071 382/100 |
| 2013/0093175 A1* | 4/2013 | Appavu | G07D 7/0006 283/70 |

FOREIGN PATENT DOCUMENTS

| | | |
|---|---|---|
| EP | 1939814 | 7/2008 |
| TW | 200823795 A | 6/2008 |
| WO | WO 2015116174 | 8/2015 |

OTHER PUBLICATIONS

Chen J. et al., "Image Tamper Detection Scheme Using QR Code and DCT Transform Techniques," (Research Paper), Proceedings for IJ3C, 2012, vol. 1, No. 2. ~ 8 pages.

Rungraungslip S. et al., "Data Hiding Method for QR Code Based on Watermark by Comparing DCT with DWT Domain," (Research Paper), ICCCT'2012, May 2012 ~ 5 pages.

Seenivasagam et al. "A QR Code Based Zero-Watermarking Scheme for Authentication of Medical Images in Teleradiology Cloud"~ Research Article ~ (2013),16 pages.

Tode C., "Magazine Readers Open to Scanning QR Codes," (Web Page), Feb. 9, 2012, <http://www.mobilemarketer.com/>, 4 pages.

Zigomitros et al ~ "Cross format embedding of metadata in images using QR codes" Conference on Intelligent Interactive Multimedia Systems and Services, 113-121 (2011).

* cited by examiner

| PAYLOAD IDENTIFIER | REUSABLE WATERMARK IDENTIFIER | GROUP IDENTIFIER | IMAGE IDENTIFIER | EMBEDDING TIMESTAMP |
|---|---|---|---|---|
| 1 | 1 | 1 | 1 | DATE1 |
| 2 | 1 | 2 | 1 | DATE2 |
| 3 | 1 | 3 | 2 | DATE3 |
| 4 | 2 | 1 | 2 | DATE4 |
| 5 | 2 | 2 | 3 | DATE5 |
| 6 | 3 | 1 | 4 | DATE6 |
| 7 | 4 | 2 | 5 | DATE7 |
| 8 | 4 | 3 | 6 | DATE8 |

MACHINE-READABLE WATERMARKS AND BARCODES IN IMAGES

BACKGROUND

The use of machine-readable watermarks in an image may involve significant processing and cost. As machine-readable watermarks may not be visible to the human eye, a computing device may need to continuously scan an image in order to determine if any watermarks are embedded therein. Further, the cost of a watermark identifier (which may be needed to access the data associated with the watermark) may be significant.

BRIEF DESCRIPTION OF THE DRAWINGS

The following detailed description references the drawings, wherein.

DETAILED DESCRIPTION

The following detailed description refers to the accompanying drawings. Wherever possible, the same reference numbers are used in the drawings and the following description to refer to the same or similar parts. While several examples are described in this document, modifications, adaptations, and other implementations are possible. Accordingly, the following detailed description does not limit the disclosed examples. Instead, the proper scope of the disclosed examples may be defined by the appended claims.

Watermarks, barcodes, and/or other types of indicia may be used to augment the information available via an image. The use of such indicia allows inclusion of information that may be used for security purposes, for authentication purposes, for providing more knowledge about the image than what may be made available via the image, and/or other information related to the image. A watermark, for example, may encode a watermark identifier, information to augment the image, and/or other information. The watermark identifier may be associated with a payload that comprises the augmented information to be made available via the watermark. The payload and the watermark identifier may be maintained by a watermark provider, who may also provide a proprietary application via which the watermark may be decoded. A barcode, for example, may encode augmenting information about the image, instructions to launch an application, multimedia information, and/or any other data that may be encoded. A barcode may or may not encode a barcode identifier. A barcode may be decoded by any number of barcode decoding applications, and may not necessarily be associated with a proprietary decoding application.

As detailed above, the use of watermarks in an image may involve significant processing and cost. As watermarks may not be visible to the human eye, a computing device may need to continuously scan an image in order to determine if any watermarks are embedded therein. Further, the cost of obtaining a watermark id from a provider may be significant. The use of barcodes in an image may affect the look and feel of the image, may cover a portion of the image so that it may not be visible or clear to a viewer, may reduce the aesthetic value of the image, and/or may otherwise affect the image.

Example embodiments disclosed herein address these issues by embedding an image with a machine-readable watermark and a barcode related to the machine-readable watermark. The machine-readable watermark and related barcode may comprise information that augments the image. The barcode may be more readily recognizable by a computing device than a watermark. The machine-readable watermark and related barcode may be adjacent to one another, such that the barcode and machine-readable watermark may share one or more edges. As such, the machine-readable watermark may be easily recognized by a computing device that decodes the machine-readable watermark. The barcode may comprise a matrix barcode, a two-dimensional barcode, one or more borders of a barcode, a finder pattern of a matrix barcode, and/or another component of a barcode.

In some examples, the machine-readable watermark may embed a reusable watermark identifier, information that augments the image, and/or other information. The barcode may be embedded with a group identifier related to the machine-readable watermark. A payload associated with the machine-readable watermark may be accessed based on the reusable watermark identifier encoded in the machine-readable watermark and the group identifier encoded in the barcode. The payload may comprise, for example, the information to augment the image. By using a combination of reusable watermark identifier and group identifier to access a payload, the cost of obtaining watermark identifiers may be reduced by reusing an obtained watermark identifier in conjunction with a plurality of different group identifiers to access respective payloads.

Figure 1:
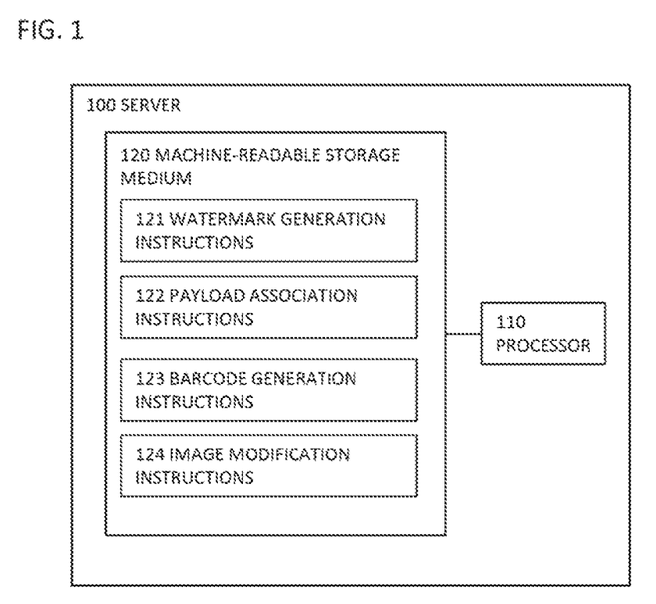
FIG. 1 is a block diagram of an example server computing device for embedding information into images.

Referring now to the drawings, FIG. 1 is a block diagram of an example server computing device 100 for embedding information into images. Server computing device 100 may be a cloud server, a mainframe, or any other device suitable for executing the functionality described below. In the embodiment of FIG. 1, server computing device 100 includes a non-transitory machine-readable storage medium 120 and a processor 110.

Processor 110 may be one or more central processing units (CPUs), microprocessors, and/or other hardware devices suitable for retrieval and execution of instructions stored in machine-readable storage medium 120. Processor 110 may fetch, decode, and execute program instructions 121, 122, 123, 124, and/or other instructions to enable embedding of information in images, as described below. As an alternative or in addition to retrieving and executing instructions, processor 110 may include one or more electronic circuits comprising a number of electronic components for performing the functionality of one or more of instructions 121, 122, 123, 124, and/or other instructions.

In one example, the program instructions 121, 122, 123, 124, and/or other instructions can be part of an installation package that can be executed by processor 110 to implement the functionality described herein. In this case, memory 120 may be a portable medium such as a CD, DVD, or flash drive or a memory maintained by a computing device from which the installation package can be downloaded and installed. In another example, the program instructions may be part of an application or applications already installed on server computing device 100.

Machine-readable storage medium 120 may be any hardware storage device for maintaining data accessible to server computing device 100. For example, machine-readable storage medium 120 may include one or more hard disk drives, solid state drives, tape drives, and/or any other storage devices. The storage devices may be located in server computing device 100 and/or in another device in communication with server 100. For example, machine-readable storage medium 120 may be any electronic, magnetic, optical, or other physical storage device that stores executable instructions. Thus, machine-readable storage medium 120 may be, for example, Random Access Memory (RAM), an Electrically-Erasable Programmable Read-Only Memory (EEPROM), a storage drive, an optical disc, and the like. As described in detail below, machine-readable storage medium 120 may be encoded with executable instructions for embedding and recognizing information in images. As detailed below, storage medium 120 may maintain and/or store the data and information described herein.

Watermark generation instructions 121, when executed by processor 110, may generate a machine-readable watermark. In some examples, the machine-readable watermark may not be discernable to the human eye, and may require the use of a computing device for recognition and decoding.

The watermark generation instructions 121, when executed by processor 110, may generate the watermark associated with a corresponding watermark identifier. The watermark identifier (and/or the watermark) may be generated based on information obtained from a third party computing device. For example, the watermark generation instructions 121, when executed by processor 110, may obtain a watermark identifier from the third party computing device and may generate a machine-readable watermark that encodes the obtained watermark identifier. As discussed further below, the machine-readable watermark may be associated with a payload based on the encoded, obtained watermark identifier. The payload associated with the machine-readable watermark may comprise, for example, information related to the image in which the machine-readable watermark may be embedded.

Payload association instructions 122, when executed by processor 110, may associate a machine-readable watermark with a payload based on a group identifier and reusable watermark identifier. In some examples, the payload association instructions 122, when executed by processor 110, may access the plurality of watermark identifiers and may store the accessed plurality of watermark identifiers as reusable watermark identifiers in the machine-readable storage 120. The payload association instructions 122, when executed by processor 110, may combine the plurality of reusable watermark identifiers with a plurality of group identifiers. In some examples, the payload association instructions 122, when executed by processor 110, may associate a payload with an individual reusable watermark identifier and an individual group identifier, such that both the individual reusable watermark identifier and the individual group identifier may be required to access the payload. In some examples, the payload association instructions 122, when executed by processor 110, may combine an individual reusable watermark identifier and an individual group identifier as a combined identifier to associate with the payload for the machine-readable watermark.

In some examples, the group identifiers may comprise a plurality of distinct identifiers, such that each combination of an individual group identifier with an individual reusable watermark identifier may be distinct. By combining an individual reusable watermark identifier with a group identifier to access a payload, the payload association instructions 122, when executed by processor 110, may allow the watermark identifiers obtained from the third party computing device to be reused multiple times and thus save costs by obtaining fewer watermark identifiers when generating watermarks for an image.

In some examples, the group identifiers may be simple delineators that may be combined with a reusable watermark identifier as a distinct identifier to access a payload. In some examples, the group identifiers may be associated with a predetermined number of groups. For example, the payload association instructions 122, when executed by processor 110, may maintain the predetermined number of groups, where each group may be correlated with an individual group identifier. The payload association instructions 122, when executed by processor 110, may correlate a payload with a group based on, for example, characteristics related to the watermark, characteristics related to the image in which the watermark may be encoded, characteristics related to the information in the payload, based on order of request for a watermark, and/or based on other criteria.

In some examples, the payload association instructions 122, when executed by processor 110, may maintain a set of associations between generated machine-readable watermarks and payloads. Responsive to the watermark generation instructions 121 generating a machine-readable watermark, the payload association instructions 122 may associate the machine-readable watermark with the payload (e.g., based on the reusable watermark identifier encoded in the machine-readable watermark and a group identifier), and may store the association for the generated machine-readable watermark in machine-readable storage 120. For example, the payload association instructions 122, when executed by processor 110, may maintain a list, table, and/or other data structure in machine-readable storage 120 that includes the associations between the generated machine-readable watermarks and payloads. The individual association may have stored in correlation therewith a reusable watermark identifier, a payload identifier, a group identifier, an image identifier, a timestamp during when the machine-readable watermark was generated, and/or other information related to the association. In this context, an individual payload may be identified by a combination of one or more of a watermark identifier, a group identifier, an image identifier, a time stamp, and/or other information related to an association with a payload.

The barcode generation instructions 123, when executed by processor 110, may generate a barcode that comprises embedded information. The barcode may comprise a two-dimensional barcode, a three-dimensional barcode, a UPC code, a matrix barcode, one or more borders of a matrix barcode, a finder pattern of a matrix barcode, and/or another component of a barcode.

In some examples, responsive to the payload association instructions 122 associating the generated machine-readable watermark with a reusable watermark identifier and group identifier, the barcode generation instructions 123, when executed by processor 110, may generate a barcode that comprises embedded information, where the embedded information includes the associated group identifier. In some examples, along with the group identifier for a watermark, the barcode generation instructions 123, when executed by processor 110, may embed other information related to the image as well. The barcode generation instructions 123, when executed by processor 110, may update the stored associations maintained by the payload association instructions 122 with a barcode identifier, and/or other information related to the association.

In some examples, the image modification instructions 124, when executed by processor 110, may embed the generated machine-readable watermark and barcode in an image. The image modification instructions 124, when executed by processor 110, may embed the generated machine-readable watermark and barcode such that the machine-readable watermark and barcode are adjacent to each other in the image. For example, the image modification instructions 124, when executed by processor 110, may embed the machine-readable watermark and barcode such that they share at least one edge.

As such, a computing device that tries to scan the machine-readable watermark may be able to easily recognize a location of the machine-readable watermark in the image based on the location of the barcode. The barcode may be more readily recognizable by a computing device than a watermark. A barcode (and/or components thereof, such as finder patterns, borders, and/or other components) may have a standardized shape and may be viewable by the human eye, enabling a computing device (and/or a user) to readily identify a location of a barcode. By placing a machine-readable watermark adjacent to the barcode, a computing device may need to scan a much smaller portion of an image (as opposed to an entire image) to access the machine-readable watermark.

In some examples, before the watermark generation instructions 121 generate the machine-readable watermark, the image modification instructions 124, when executed by processor 110, may receive information related to an image to be augmented, and/or a payload comprising information to augment the image. Based on the image to be augmented and the payload, the watermark generation instructions 121, when executed by processor 110, may generate the machine-readable watermark. In some examples, based on the image to be augmented and the payload, the payload association instructions 122, when executed by processor 110, may determine a group identifier for the machine-readable watermark.

In some examples, the image modification instructions 124, when executed by processor 110, may embed the first machine-readable watermark and the first barcode in the first image such that the first machine-readable watermark is adjacent to the first barcode, by first determining a watermark position of a machine-readable watermark in an image and then determining a barcode position of a barcode in the image based on the a position of the machine-readable watermark. In some examples, the image modification instructions 124, when executed by processor 110, may determine a barcode position of the barcode in the image and a watermark position of the machine-readable watermark in the image based on the position of the barcode. The image modification instructions 124, when executed by processor 110, may determine the watermark position and/or the barcode position based on information received with the image and the payload, based on information received from a user of the computing device 100, based on a predetermined placement stored in the machine-readable storage 120, based on determining a placement of the machine-readable watermark and barcode such that the barcode covers a least amount of the image, and/or based on other criteria.

The image modification instructions 124, when executed by processor 110, may embed the machine-readable watermark at the determined watermark position and the barcode at the determined barcode position. As mentioned above, the barcode may comprise an individual border such as, for example, a rectangular pattern (e.g., a border of a matrix barcode, and/or other rectangular pattern). In some examples, an individual border may comprise a finder pattern of a matrix barcode.

In some examples where the barcode comprises a first border, the image modification instructions 124, when executed by processor 110, may embed the machine-readable watermark and the barcode such that an edge of the first border and an edge of the machine-readable watermark are shared. In some examples where the barcode may comprise a second border perpendicular to the first border, the image modification instructions 124, when executed by processor 110, may embed the machine-readable watermark and the barcode such that an edge of the second border and a second edge of the machine-readable watermark are shared. In some examples, an edge of the barcode and an edge of the machine-readable watermark may be shared by having the edges be adjacent to each other, by having the edges overlap, by having the edges comprise the same pixels on the image, and/or in other manners.

The size, orientation, type of barcode, and/or other characteristics of the machine-readable watermark and/or barcode may be determined based on information received with the image and the payload, based on information received from a user of the computing device 100, based on predetermined characteristics stored in the machine-readable storage 120, based on a determination of characteristics that allow the barcode to cover a least amount of the image, and/or based on other criteria.

Figure 2:
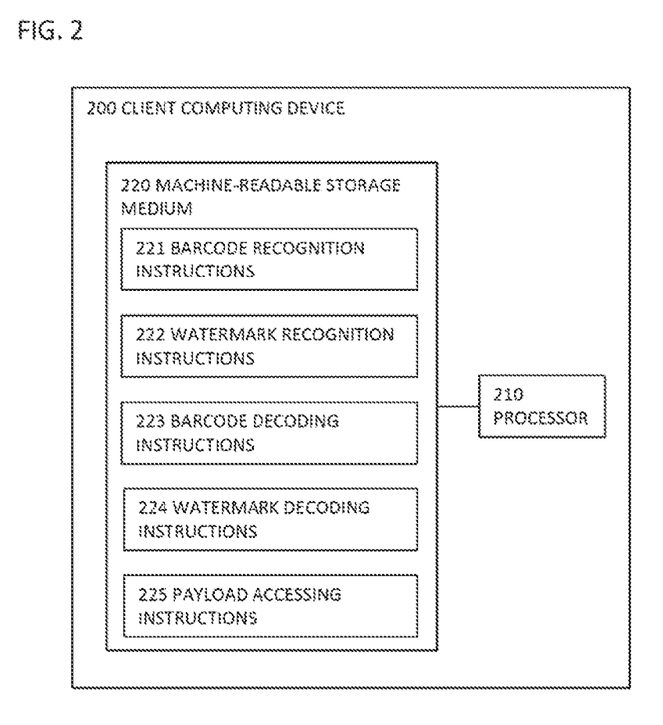
FIG. 2 is a block diagram of an example client computing device for recognizing embedded information in images.

Referring now to the drawings, FIG. 2 is a block diagram of an example client computing device 200 for recognizing information in images. Client computing device 200 may be a notebook, desktop, tablet, workstation, mobile device, or any other device suitable for executing the functionality described below. In some examples, client computing device 200 may be any computing device accessible to a server computing device, such as server computing device 100 of FIG. 1, over the Internet. In the embodiment of FIG. 2, client computing device 200 includes a processor 220 and a machine-readable storage medium 210.

Processor 210 may be one or more central processing units (CPUs), microprocessors, and/or other hardware devices suitable for retrieval and execution of instructions stored in machine-readable storage medium 220. Processor 210 may fetch, decode, and execute program instructions 221, 222, 223, 224, 225, and/or other instructions to recognize information in images, as described below. As an alternative or in addition to retrieving and executing instructions, processor 210 may include one or more electronic circuits comprising a number of electronic components for performing the functionality of one or more of instructions 221, 222, 223, 224, 225, and/or other instructions.

In one example, the instructions 221, 222, 223, 224, 225, and/or other instructions can be part of an installation package that can be executed by processor 210 to implement the functionality described herein. In this case, memory 220 may be a portable medium such as a CD, DVD, or flash drive or a memory maintained by another server computing device from which the installation package can be downloaded and installed. In another example, the program instructions may be part of an application or applications already installed on client computing device 200.

Machine-readable storage medium 220 may be any hardware storage device for maintaining data accessible to client computing device 200. For example, machine-readable storage medium 210 may include one or more hard disk drives, solid state drives, tape drives, and/or any other storage devices. The storage devices may be located in client computing device 200 and/or in another device in communication with server 100. For example, machine-readable storage medium 220 may be any electronic, magnetic, optical, or other physical storage device that stores executable instructions. Thus, machine-readable storage medium 220 may be, for example, Random Access Memory (RAM), an Electrically-Erasable Programmable Read-Only Memory (EEPROM), a storage drive, an optical disc, and the like. As described in detail below, machine-readable storage medium 220 may be encoded with executable instructions for determining user experience of an application. As detailed below, storage medium 220 may maintain and/or store the data and information described herein.

Barcode recognition instructions 221, when executed by processor 210, may recognize a barcode in an image. The barcode recognition instructions 221, when executed by processor 210, may recognize the barcode based on identifying characteristics of the barcode. For example, the barcode recognition instructions 221, when executed by processor 210, may recognize the barcode based on identifying characteristics related to standards associated with the barcode. In some examples, the barcode recognition instructions 221, when executed by processor 210, may recognize the barcode in an image responsive to having the client computing device 200 scan the image. The client computing device 200 may scan the entire image, may sequentially scan portions of an image until a barcode is recognized, and/or may scan the image in other manners.

The watermark recognition instructions 221, when executed by processor 210, may recognize a machine-readable watermark based on the recognized barcode. The watermark recognition instructions 221, when executed by processor 210, may recognize the machine-readable watermark based on the location of the recognized barcode. In some examples in which the barcode comprises a single border, the watermark recognition instructions 221, when executed by processor 210, may cause the client computing device 200 to scan an area adjacent to the edges of the single border to recognize the machine-readable watermark. In some examples in which the barcode comprises two border, the watermark recognition instructions 221, when executed by processor 210, may cause the client computing device 200 to scan an area within the intersection of the two border. As such, the area of the image to be scanned by a client computing device 200 to find a machine-readable watermark may be significantly diminished, increasing the efficiency of processing machine-readable watermarks.

The barcode decoding instructions 223, when executed by processor 210, may decode the first barcode to obtain a group identifier. For example, the barcode decoding instructions 223, when executed by processor 210, may decode the barcode according to standards associated with the barcode. The barcode decoding instructions 223, when executed by processor 210, may decode the barcode to obtain the information embedded therein. The information may include, for example, a group identifier associated with the machine-readable watermark adjacent to the barcode, and/or other information that may augment the image and/or the barcode.

The watermark decoding instructions 224, when executed by processor 210, may decode the watermark. The watermark decoding instructions 224, when executed by processor 210, may decode the machine-readable watermark to obtain a reusable watermark identifier embedded therein, and/or other information related to the machine-readable watermark and/or the image. The watermark decoding instructions 224, when executed by processor 210, may decode the watermark based on standards associated with the watermark, based on decoding technology associated with the third party computing device from which watermark identifiers were obtained, and/or in other manners.

The payload accessing instructions 225, when executed by processor 210, may access a payload associated with the machine-readable watermark based on the group identifier obtained from the barcode, the reusable watermark identifier obtained from the machine-readable watermark. The payload accessing instructions 225, when executed by processor 210, may send a request to the server computing device 100 for the payload. The request may comprise, for example, the group identifier, the reusable watermark identifier, and/or other information related to the watermark and/or the image. Responsive to sending the request, the payload accessing instructions 225, when executed by processor 210, may receive the payload from the server computing device 100. In some examples, the payload accessing instructions 225, when executed by processor 210, may receive the payload in the form of data to augment the image, an augmented image, a launch of an application, a hyperlink for a client browser to browse, and/or other types of payloads.

Figure 3:
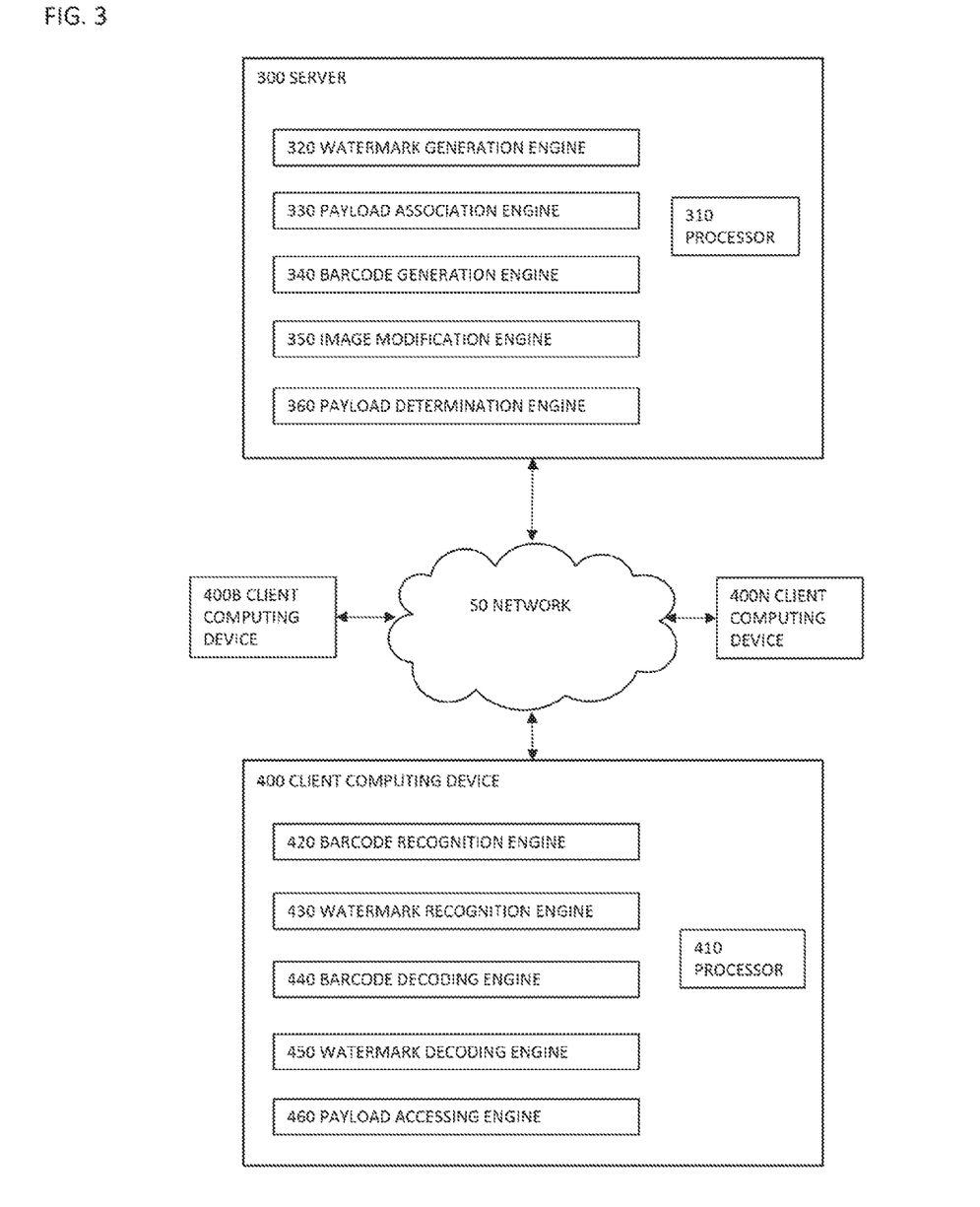
FIG. 3 is a block diagram of an example server computing device in communication with a plurality of client computing devices for embedding and recognizing information in images.

FIG. 3 is a block diagram of an example server computing device 300 in communication with a plurality of client computing devices 400, 400B, . . . , 400N for embedding and recognizing information in images. As with processor 110 of FIG. 1, processor 320 may be one or more CPUs, microprocessors, and/or other hardware devices suitable for retrieval and execution of instructions.

As illustrated in FIG. 3 and described below, server computing device 300 may communicate with client computing device 400. As with server computing device 100 of FIG. 1, server computing device 300 may be a cloud server, a mainframe, or any other device suitable for executing the functionality described below. As detailed below, server computing device 300 may include a series of engines 320-360 for embedding information into images. Each of the engines may generally represent any combination of hardware and programming. For example, the programming for the engines may be processor executable instructions stored on a non-transitory machine-readable storage medium and the hardware for the engines may include at least one processor of the server computing device 300 to execute those instructions. In addition or as an alternative, each engine may include one or more hardware devices including electronic circuitry for implementing the functionality described below.

Watermark generation engine 320 may generate a machine-readable watermark for embedding into an image. In some examples, the watermark generation engine 320 may generate the machine-readable watermark in a manner the same as or similar to that of the server computing device 300. Further details regarding an example implementation of watermark generation engine 320 are provided above in connection with watermark generation instructions 122 of FIG. 1.

Payload association engine 330 may associate a machine-readable watermark with a payload based on a reusable watermark identifier and a group identifier. In some examples, the payload association engine 330 may associate the machine-readable watermark with a payload based on the reusable watermark identifier and the group identifier in a manner the same as or similar to that of the server computing device 300. Further details regarding an example implementation of payload association engine 330 are provided above in connection with payload association instructions 123 of FIG. 1.

Barcode generation engine 340 may generate a barcode comprising embedded information that includes a group identifier associated with the machine-readable watermark. In some examples, the barcode generation engine 340 may generate the barcode in a manner the same as or similar to that of the server computing device 300. Further details regarding an example implementation of barcode generation engine 340 are provided above in connection with barcode generation instructions 123 of FIG. 1.

Image modification engine 350 may embed the machine-readable watermark and barcode in an image such that the machine-readable watermark and the barcode are adjacent to each other. In some examples, the image modification engine 350 may generate the machine-readable watermark in a manner the same as or similar to that of the server computing device 300. Further details regarding an example implementation of watermark generation engine 350 are provided above in connection with image modification instructions 124 of FIG. 1.

Payload determination engine 360 may determine a payload to provide to a requesting computing device. The payload determination engine 360 may receive, from a requesting computing device (e.g., client computing device 400), a request for a payload. The request may comprise, for example, a group identifier, a watermark identifier, and/or other information related to the payload. The payload determination engine 360 may determine an associated payload based on the information in the request. For example, the payload determination engine 360 may determine a payload associated with a group identifier and a reusable watermark identifier that matches the group identifier and the watermark identifier included in the request. Responsive to determining a payload, the payload determination engine 360 may provide the determined payload to the requesting computing device.

In some examples, the payload determination engine 360 may provide the determined payload by providing the information included in the payload. In some examples, the payload determination engine 360 may augment the image associated with the information included in the payload and may provide the augmented image. In some examples, the payload may be associated with instructions regarding how the payload is to be provided. For example, instructions may comprise causing an application to be launched, causing a hyperlink to be sent to a browser on the requesting computing device, and/or other types of instructions. In these examples, the payload determination engine 360 may provide the payload according to the associated instructions.

Returning to FIG. 3, as with client computing device 200 of FIG. 1, client computing device 400 may a notebook, desktop, tablet, workstation, mobile device, or any other device suitable for executing the functionality described below. In some examples, client computing device 400 may be any computing device accessible to a server computing device, such as server computing device 300, over the Internet. As detailed below, client computing device 400 may include a series of engines 420-460 for recognizing information in images. As discussed above, each of the engines may generally represent any combination of hardware and programming. For example, the programming for the engines may be processor executable instructions stored on a non-transitory machine-readable storage medium and the hardware for the engines may include at least one processor of the client computing device 400 to execute those instructions. In addition or as an alternative, each engine may include one or more hardware devices including electronic circuitry for implementing the functionality described below.

Barcode recognition engine 420 may recognize a barcode in an image. The barcode recognition engine 420 may recognize a barcode in a manner the same as or similar to that of the client computing device 400. Further details regarding an example implementation of barcode recognition engine 420 are provided above in connection with barcode recognition instructions 221 of FIG. 2.

Watermark recognition engine 430 may recognize a machine-readable watermark in an image. The barcode recognition engine 420 may recognize a machine-readable watermark in a manner the same as or similar to that of the client computing device 400. Further details regarding an example implementation of watermark recognition engine 430 are provided above in connection with watermark recognition instructions 222 of FIG. 2.

Barcode decoding engine 440 may decode the barcode to obtain a group identifier. The barcode decoding engine 440 may decode a barcode in a manner the same as or similar to that of the client computing device 400. Further details regarding an example implementation of barcode decoding engine 440 are provided above in connection with barcode decoding instructions 224 of FIG. 2.

Watermark decoding engine 450 may decode the barcode to obtain a group identifier. The watermark decoding engine 450 may decode a machine-readable watermark in a manner the same as or similar to that of the client computing device 400. Further details regarding an example implementation of watermark decoding engine 450 are provided above in connection with barcode decoding instructions 223 of FIG. 2.

Payload accessing engine 460 may access a payload associated with the machine-readable watermark based on the group identifier and watermark identifier. The payload accessing engine 460 may decode a machine-readable watermark in a manner the same as or similar to that of the client computing device 400. Further details regarding an example implementation of payload accessing engine 460 are provided above in connection with payload accessing instructions 225 of FIG. 2.

Figure 4:
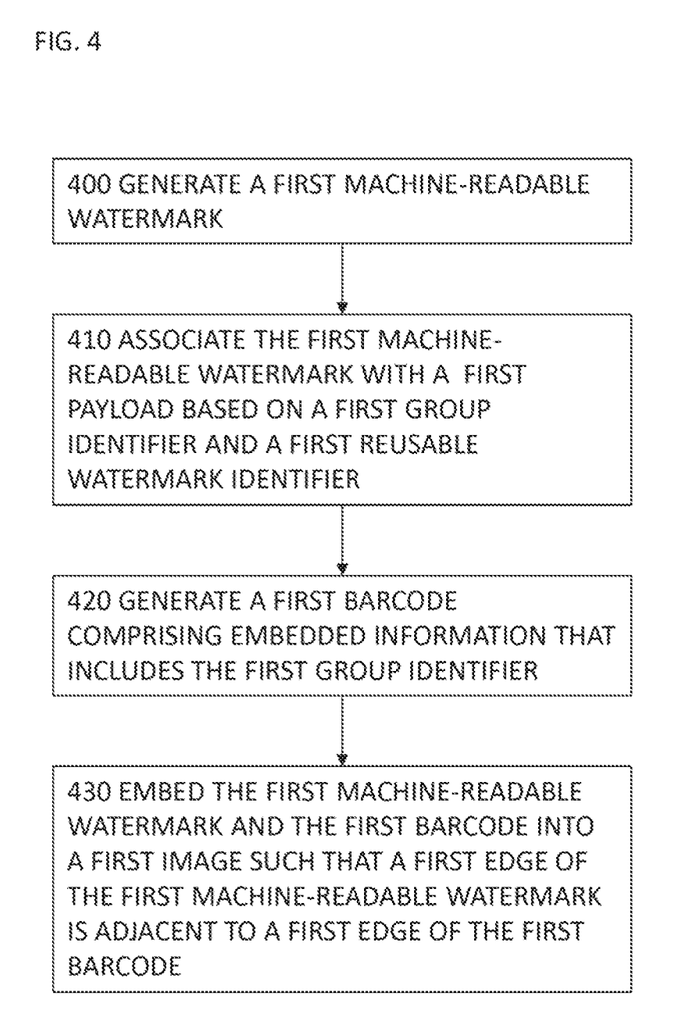
FIG. 4 is a flowchart of an example method for execution by a server computing device for embedding information into images.

FIG. 4 is a flowchart of an example method for execution by a server computing device for embedding information into images.

Although execution of the method described below is with reference to server computing device 100 of FIG. 1 and/or server computing device 300 of FIG. 3, other suitable devices for execution of this method will be apparent to those of skill in the art, such as client computing device 400 of FIG. 3 The method described in FIG. 4 and other figures may be implemented in the form of executable instructions stored on a machine-readable storage medium, such as storage medium 120, by one or more engines described herein, and/or in the form of electronic circuitry.

In an operation 400, a first machine-readable watermark may be generated. For example, the server computing device 100 (and/or the watermark generation instructions 121, the watermark generation engine 320, or other resource of the server computing device 100) may generate the watermark. The server computing device 100 may generate the watermark in a manner similar or the same as that described above in relation to the execution of the watermark generation instructions 121, the watermark generation engine 320, and/or other resource of the server computing device 100.

In an operation 410, the first machine-readable watermark may be associated with a first payload based on a first group identifier and a first reusable watermark identifier. For example, the server computing device 100 (and/or the payload association instructions 122, the payload association engine 330, or other resource of the server computing device 100) may associate the first machine-readable watermark with the first payload. The server computing device 100 may associate the first machine-readable watermark with the first payload in a manner similar or the same as that described above in relation to the execution of the payload association instructions 122, the payload association engine 330, and/or other resource of the server computing device 100.

In an operation 420, a first barcode may be generated that comprises embedded information, where the embedded information includes the first group identifier. For example, the server computing device 100 (and/or the barcode generation instructions 123, the barcode generation engine 340, or other resource of the server computing device 100) may generate the first barcode. The server computing device 100 may generate the first barcode in a manner similar or the same as that described above in relation to the execution of the barcode generation instructions 123, the barcode generation engine 340, and/or other resource of the server computing device 100.

In an operation 430, the first machine-readable watermark and first barcode may be embedded in a first image such that a first edge of the first machine-readable watermark is adjacent to a first edge of the first barcode. For example, the server computing device 100 (and/or the image modification instructions 124, the image modification engine 350, or other resource of the server computing device 100) may change the monitoring mode. The server computing device 100 may change the monitoring mode in a manner similar or the same as that described above in relation to the execution of the image modification instructions 124, the image modification engine 350, and/or other resource of the server computing device 100.

Figure 5:
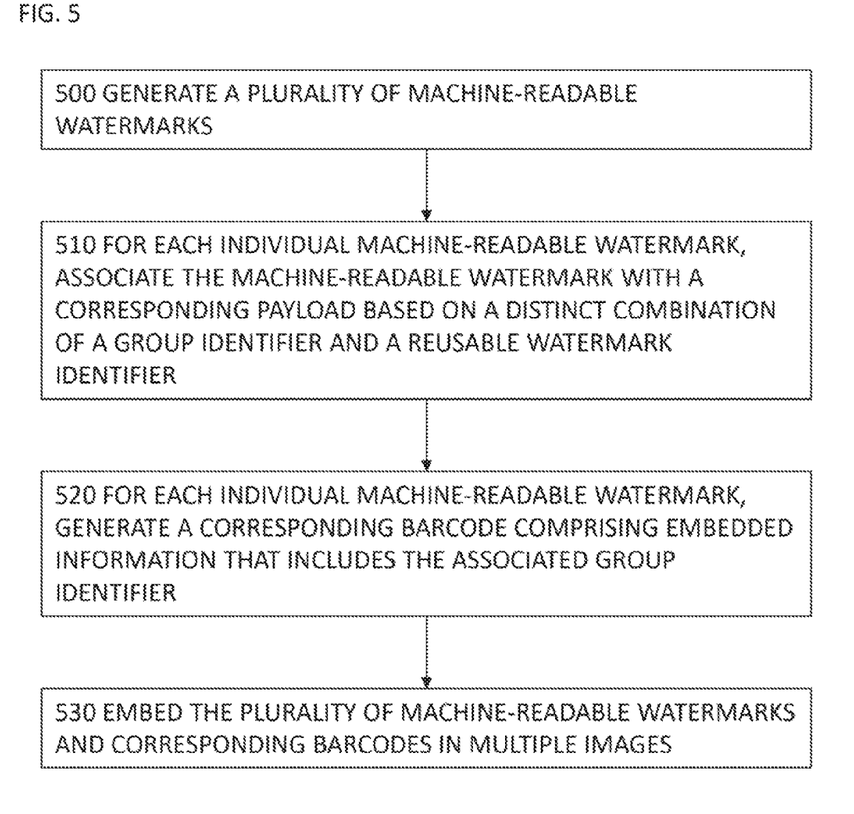
FIG. 5 is a flowchart of an example method for execution by a server computing device for embedding information into images.

FIG. 5 is a flowchart of an example method for execution by a server computing device for embedding information into images.

In an operation 500, a plurality of machine-readable watermarks may be generated. For example, the server computing device 100 (and/or the watermark generation instructions 121, the watermark generation engine 320, or other resource of the server computing device 100) may generate the plurality of watermarks. The server computing device 100 may generate the plurality of watermarks in a manner similar or the same as that described above in relation to the execution of the watermark generation instructions 121, the watermark generation engine 320, and/or other resource of the server computing device 100.

In an operation 510, each machine-readable watermark may be associated with a corresponding payload based on a distinct combination of a group identifier and a reusable watermark identifier. For example, the server computing device 100 (and/or the payload association instructions 122, the payload association engine 330, or other resource of the server computing device 100) may associate each machine-readable watermark with a payload. The server computing device 100 may associate each machine-readable watermark with a payload in a manner similar or the same as that described above in relation to the execution of the payload association instructions 122, the payload association engine 330, and/or other resource of the server computing device 100.

In an operation 520, a corresponding barcode may be generated for each generated watermark, where the corresponding barcode comprises embedded information, where the embedded information includes the group identifier of the corresponding watermark. For example, the server computing device 100 (and/or the barcode generation instructions 123, the barcode generation engine 340, or other resource of the server computing device 100) may generate the corresponding barcodes. The server computing device 100 may generate the corresponding barcodes in a manner similar or the same as that described above in relation to the execution of the barcode generation instructions 123, the barcode generation engine 340, and/or other resource of the server computing device 100.

In an operation 530, the plurality of corresponding machine-readable watermarks and barcodes may be embedded in multiple image. For example, the server computing device 100 (and/or the image modification instructions 124, the image modification engine 350, or other resource of the server computing device 100) may embed the corresponding machine-readable watermarks and barcodes. The server computing device 100 may embed the corresponding machine-readable watermarks and barcodes in a manner similar or the same as that described above in relation to the execution of the image modification instructions 124, the image modification engine 350, and/or other resource of the server computing device 100.

Figure 6:
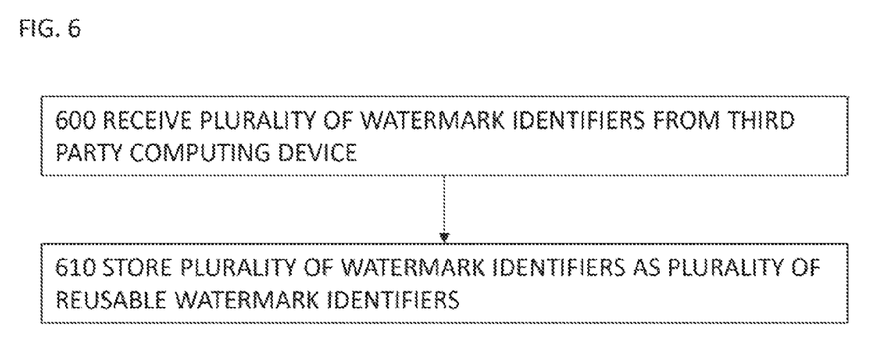
FIG. 6 is a flowchart of an example method for execution by a server computing device for obtaining reusable watermark identifiers.

FIG. 6 is a flowchart of an example method for execution by a server computing device for obtaining reusable watermark identifiers.

In an operation 600, a plurality of watermark identifiers may be received from a third party. For example, the server computing device 100 (and/or the watermark generation instructions 121, the watermark generation engine 320, or other resource of the server computing device 100) may receive the watermark identifiers. The server computing device 100 may receive the watermark identifiers in a manner similar or the same as that described above in relation to the execution of the watermark generation instructions 122, the watermark generation engine 320, and/or other resource of the server computing device 100.

In an operation 610, the plurality of watermark identifiers may be stored as a plurality of reusable watermark identifiers. For example, the server computing device 100 (and/or the watermark generation instructions 121, the watermark generation engine 320, the payload association instructions 122, the payload association engine 330, or other resource of the server computing device 100) may store the received plurality of watermark identifiers as a plurality of reusable watermark identifiers. The server computing device 100 may store the received plurality of watermark identifiers as a plurality of reusable watermark identifiers in a manner similar or the same as that described above in relation to the execution of the watermark generation instructions 121, the watermark generation engine 320, the payload association instructions 122, the payload association engine 330, and/or other resource of the server computing device 100.

Figure 7:
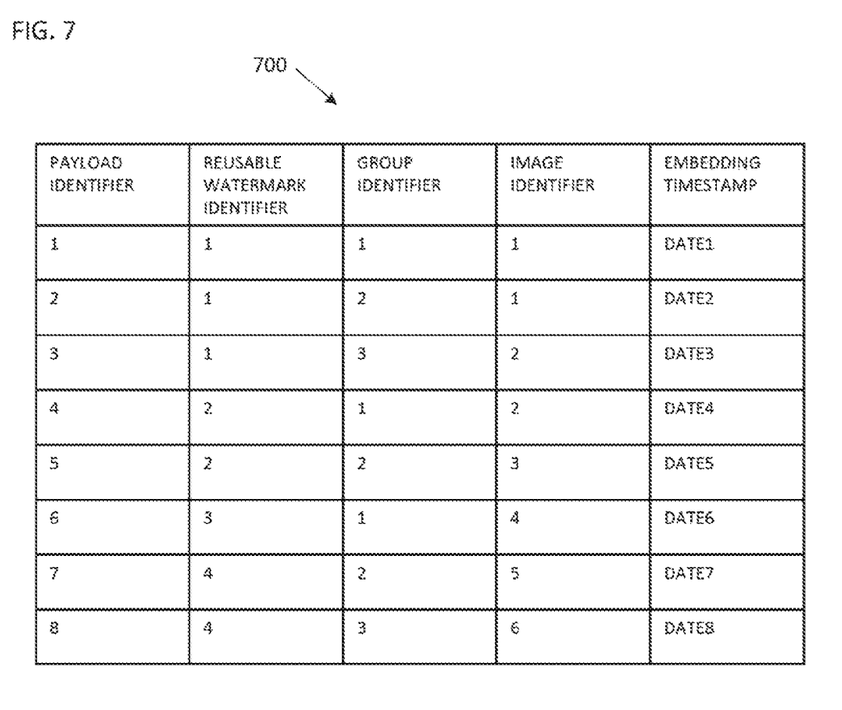
FIG. 7 is an example table comprising information related to associations between watermarks and payloads.

FIG. 7 depicts an example table 700 comprising information related to associations between watermarks and payloads. For example, the information related to associations between watermarks and payloads may comprise information related to each watermark embedded in an image. An association between a watermark and a payload may comprise, for example, a mapping of a set of information associated with an image including a watermark to a payload. The information related to an individual association may comprise, for example, a payload identifier, a reusable watermark identifier, a group identifier, an image identifier, a timestamp at which the watermark was embedded into the image, and/or other information related to the association. In some examples, information related to the barcode embedded along with the watermark may also be included in the table. Other information related to embedding information in an image may also be included, and the information included in the table is not limited to the examples described herein. In some examples, the table 700 may be used to find a payload identifier associated with a combination of the reusable watermark identifier and group identifier, such that a payload associated with the watermark may be accessed. For example, the server computing device 100 may receive a request comprising a reusable watermark identifier 2 and a group identifier 1. The server computing device 100 may use the table 700 to determine a payload identifier 4 based on the reusable watermark identifier and the group identifier, and may then access a payload associated with the determined payload identifier.

Figure 8:
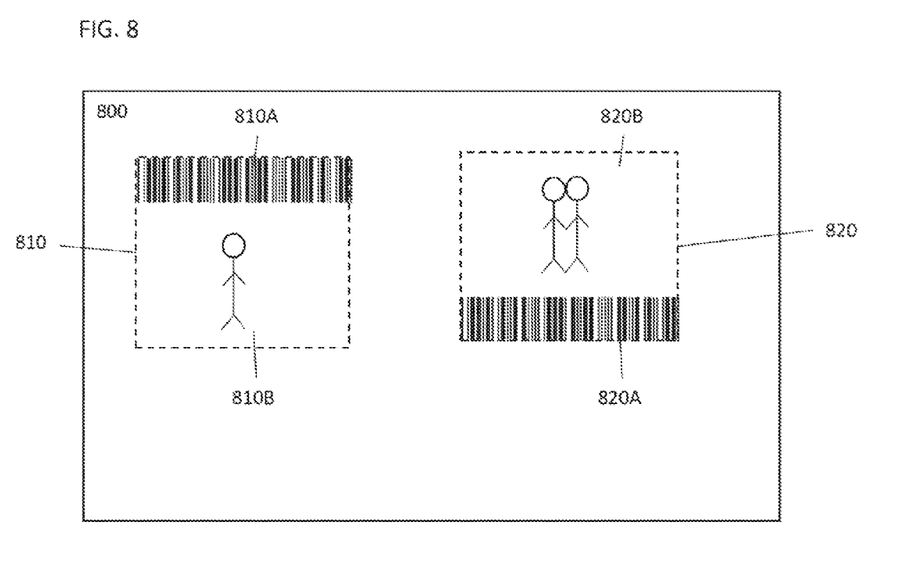
FIG. 8 is an example image comprising embedded information.
Figure 9:
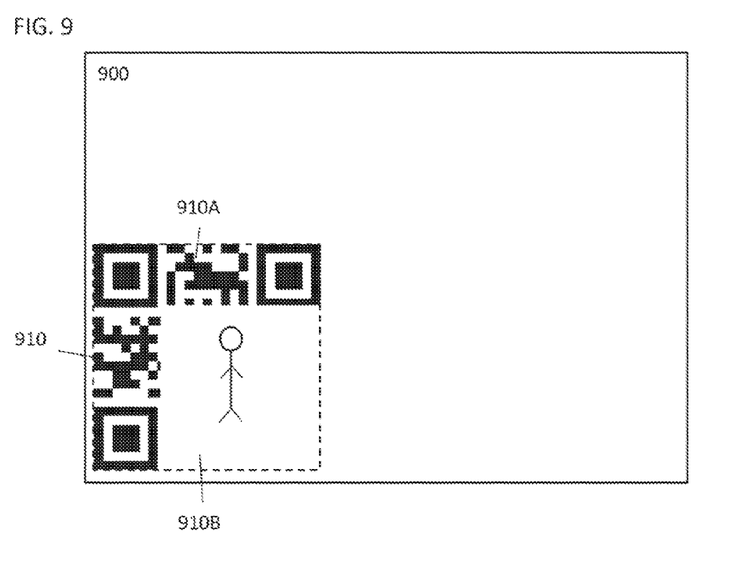
FIG. 9 is an example image comprising embedded information.

FIGS. 8 and 9 depict example images comprising embedded information. The example image 800 of FIG. 8 comprises a first embedded image 810 including a machine-readable watermark 810A adjacent to a first barcode 810B. The image 800 may also comprise a second embedded image 820 including a machine-readable watermark 820A adjacent to a first barcode 820B. The example image 900 of FIG. 9 comprises a third embedded image 910 including a machine-readable watermark 910A adjacent to a first barcode 910B. Although the example images show a particular number of embedded images in various locations, each image could include a greater or fewer number of embedded images, with the positions, sizes, orientations, and/or other characteristics of those embedded images varying. The embedded images depicted in these figures are examples only, and the characteristics and number of embedded images in an image are not limited to the examples described herein.

Figure 10:
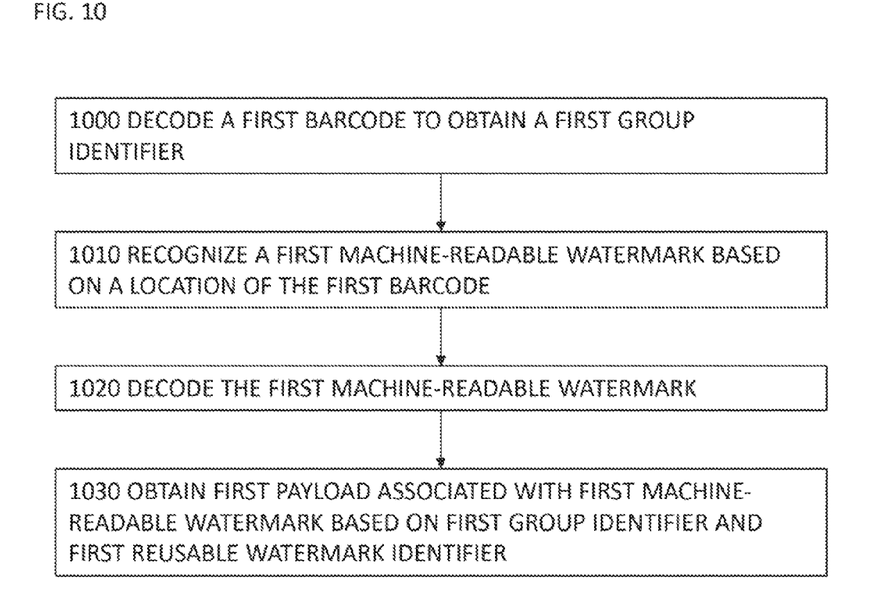
FIG. 10 is a flowchart of an example method for execution by a client computing device for recognizing embedded information in images.
Figure 10A:
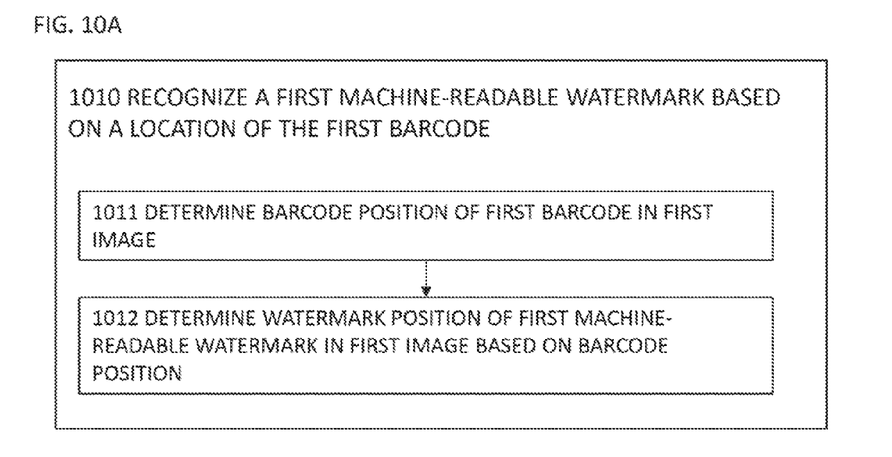
FIG. 10A is a flowchart of an example method for execution by a client computing device for recognizing a machine-readable watermark based on a location of a barcode in an image.

FIG. 10 is a flowchart of an example method for execution by a client computing device for recognizing embedded information in images. FIG. 10A is a flowchart of an example method for execution by a client computing device for recognizing a machine-readable watermark based on a location of a barcode in an image.

In an operation 1000, the client computing device 200 may decode a first barcode to obtain a first group identifier. For example, the client computing device 400 (and/or the barcode recognition instructions 221, the barcode recognition engine 420, or other resource of the client computing device 200) may decode the first barcode. The client computing device 200 may decode the first barcode in a manner similar or the same as that described above in relation to the execution of the barcode recognition instructions 221, the barcode recognition engine 420, and/or other resource of the client computing device 200.

In an operation 1010, the client computing device 200 may recognize a first machine-readable watermark based on a location of the first barcode. For example, the client computing device 400 (and/or the watermark recognition instructions 222, the watermark recognition engine 430, or other resource of the client computing device 200) may recognize the first machine-readable watermark. The client computing device 200 may recognize the first machine-readable watermark in a manner similar or the same as that described above in relation to the execution of the watermark recognition instructions 222, the watermark recognition engine 430, and/or other resource of the client computing device 200.

For example, the client computing device 200 may recognize the first machine-readable watermark based on the location of the first barcode in a variety of ways. As described above, FIG. 10A is a flowchart of an example method for execution by a client computing device for recognizing a machine-readable watermark based on a location of a barcode in an image.

In an operation 1011, the client computing device 200 may determine a barcode position of the first barcode in the first image. For example, the client computing device 400 (and/or the barcode recognition instructions 221, the barcode decoding instructions 223, the barcode recognition engine 420, the barcode decoding engine 440, or other resource of the client computing device 200) may determine the barcode position. The client computing device 200 may determine the barcode position in a manner similar or the same as that described above in relation to the execution of the barcode recognition instructions 221, the barcode decoding instructions 223, the barcode recognition engine 420, the barcode decoding engine 440, and/or other resource of the client computing device 200.

In an operation 1012, the client computing device 200 may determine a watermark position of the first machine-readable watermark in the first image based on the barcode position. For example, the client computing device 400 (and/or the watermark recognition instructions 222, the watermark recognition engine 430, or other resource of the client computing device 200) may determine the watermark position. The client computing device 200 may determine the watermark position in a manner similar or the same as that described above in relation to the execution of the watermark recognition instructions 222, the watermark recognition engine 430, and/or other resource of the client computing device 200.

Returning to FIG. 10, in an operation 1020, the client computing device 200 may decode the first machine-readable watermark. For example, the client computing device 400 (and/or the watermark decoding instructions 224, the watermark decoding engine 450, or other resource of the client computing device 200) may decode the first machine-readable watermark. The client computing device 200 may decode the first machine-readable watermark in a manner similar or the same as that described above in relation to the execution of the watermark decoding instructions 224, the watermark decoding engine 450, and/or other resource of the client computing device 200.

In an operation 1030, the client computing device 200 may obtain a first payload associated with the first machine-readable watermark based on the first group identifier and a first reusable watermark identifier. For example, the client computing device 400 (and/or the payload accessing instructions 225, payload accessing engine 460, or other resource of the client computing device 200) may obtain the first payload. The client computing device 200 may obtain the first payload in a manner similar or the same as that described above in relation to the execution of the payload accessing instructions 225, payload accessing engine 460, and/or other resource of the client computing device 200.

Figure 11:
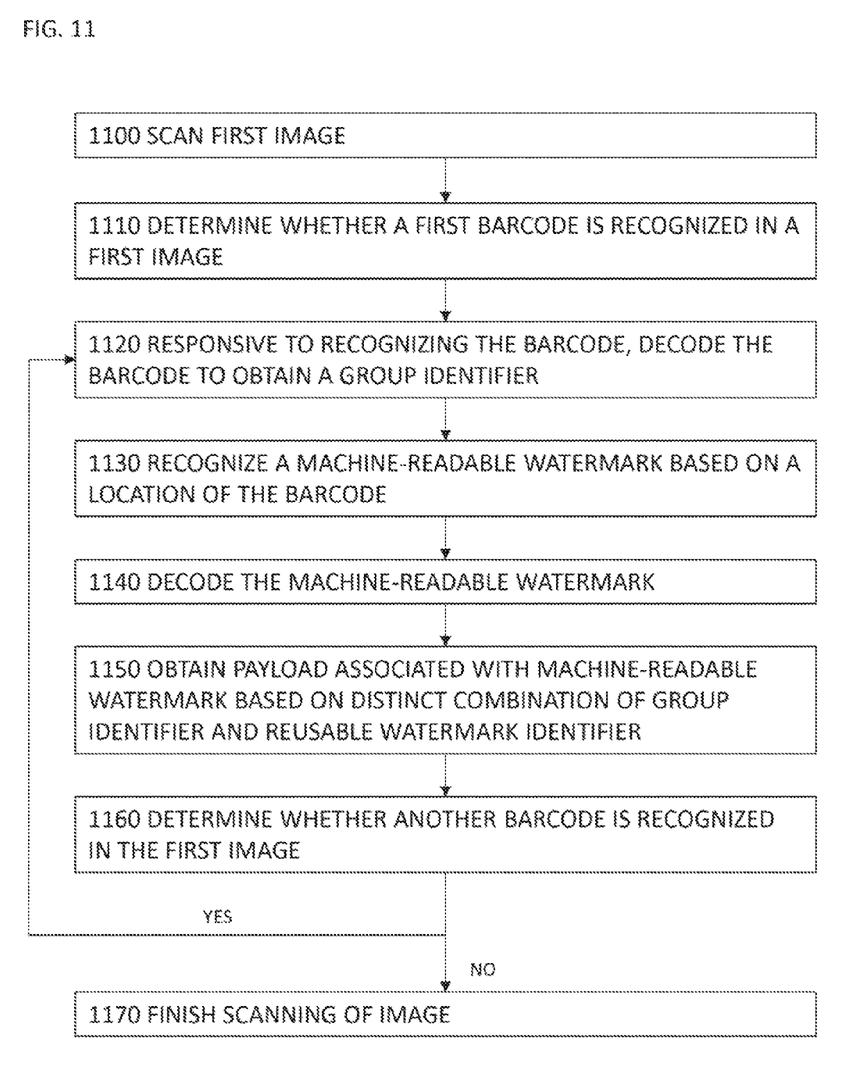
FIG. 11 is a flowchart of an example method for execution by a client computing device for recognizing embedded information in images.

FIG. 11 is a flowchart of an example method for execution by a client computing device for recognizing embedded information in images.

In an operation 1100, the client computing device 200 may scan the first image. For example, the client computing device 400 may scan a first image responsive to a user request to scan the first image, may automatically scan the image, and/or may otherwise initiate scanning of the first image.

In an operation 1110, the client computing device 200 may determine whether a first barcode is recognized in the first image. For example, the client computing device 400 (and/or the barcode recognition instructions 221, the barcode recognition engine 420, or other resource of the client computing device 200) may determine whether the first image includes a first barcode. The client computing device 200 may determine whether the first image includes a first barcode in a manner similar or the same as that described above in relation to the execution of the barcode recognition instructions 221, the barcode recognition engine 420, and/or other resource of the client computing device 200.

In an operation 1120, the client computing device 200 may decode the barcode to obtain a group identifier responsive to recognizing a barcode in the first image. For example, the client computing device 400 (and/or the barcode decoding instructions 223, the barcode decoding engine 440, or other resource of the client computing device 200) may decode the recognized barcode. The client computing device 200 may decode the recognized barcode in a manner similar or the same as that described above in relation to the execution of the barcode decoding instructions 223, the barcode decoding engine 440, and/or other resource of the client computing device 200.

In an operation 1130, the client computing device 200 may recognize a machine-readable watermark based on the location of the recognized barcode. For example, the client computing device 400 (and/or the watermark recognition instructions 222, the watermark recognition engine 430, or other resource of the client computing device 200) may recognize the machine-readable watermark. The client computing device 200 may recognize the machine-readable watermark in a manner similar or the same as that described above in relation to the execution of the watermark recognition instructions 222, the watermark recognition engine 430, and/or other resource of the client computing device 200.

In an operation 1140, the client computing device 200 may decode the recognized machine-readable watermark. For example, the client computing device 400 (and/or the watermark decoding instructions 224, the watermark decoding module 450, or other resource of the client computing device 200) may decode the recognized machine-readable watermark. The client computing device 200 may decode the recognized machine-readable watermark in a manner similar or the same as that described above in relation to the execution of the watermark decoding instructions 224, the watermark decoding module 450, and/or other resource of the client computing device 200.

In an operation 1150, the client computing device 200 may obtain a payload associated with the recognized machine-readable watermark based on a distinct combination of group identifier and reusable watermark identifier. For example, the client computing device 400 (and/or the payload accessing instructions 225, payload accessing engine 460, or other resource of the client computing device 200) may obtain the payload. The client computing device 200 may obtain the payload in a manner similar or the same as that described above in relation to the execution of the payload accessing instructions 225, payload accessing engine 460, and/or other resource of the client computing device 200.

In an operation 1160, the client computing device 200 may determine whether another barcode may be recognized in the first image. For example, the client computing device 400 (and/or the barcode recognition instructions 221, the barcode recognition engine 420, or other resource of the client computing device 200) may determine whether another barcode may be recognized. The client computing device 200 may determine whether another barcode may be recognized in a manner similar or the same as that described above in relation to the execution of the barcode recognition instructions 221, the barcode recognition engine 420, and/or other resource of the client computing device 200.

Responsive to another barcode being recognized, the client computing device 200 may decode the barcode and repeat operations 1120 to 1160 for the recognized barcode. Responsive to another barcode not being recognized, the client computing device 200 may continue to operation 1170.

In an operation 1170, the client computing device 200 may finish the scanning of the first image. For example, the client computing device 400 may finish scanning the first image responsive to determining that no other barcodes are recognized in the first image.

The foregoing disclosure describes a number of example embodiments for monitoring application flow of an application responsive to receiving a monitoring mode upon launch of a session of the application. The disclosed examples may include systems, devices, computer-readable storage media, and methods for measuring user action performance. For purposes of explanation, certain examples are described with reference to the components illustrated in FIGS. 1-11. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Further, the sequence of operations described in connection with FIGS. 1-11 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

We claim:

1. A non-transitory machine-readable storage medium comprising instructions executable by a processing resource of a computing device for recognizing embedded information from images to:
recognize a first barcode from a first image;
recognize a first machine-readable watermark based on the first barcode;
decode the first barcode to obtain a first group identifier;
decode the first machine-readable watermark; and
access a first payload associated with the first machine-readable watermark based on the first group identifier and a first reusable watermark identifier of the first machine-readable watermark.

2. The storage medium of claim 1, wherein the instructions executable by the processing resource of the computing device comprise instructions to:
obtain the first reusable watermark identifier from the decoded first machine-readable watermark.

3. The storage medium of claim 1, wherein the instructions executable by the processing resource of the computing device comprise instructions to:
recognize a second barcode in the first image;
recognize a second machine-readable watermark based on the second barcode;
decode the second barcode to obtain a second group identifier;
decode the second machine-readable watermark; and
access a second payload associated with the second machine-readable watermark based on the second group identifier and the first reusable watermark identifier of the second machine-readable watermark.

4. The storage medium of claim 1, wherein the instructions to access the second payload comprise instructions to:
access a second payload associated with a second machine-readable watermark based on a second group identifier and a second reusable watermark identifier of the second machine-readable watermark.

5. The storage medium of claim 4, wherein the instructions to access the second payload comprise instructions to:
access a third payload associated with a third machine-readable watermark, based on the second group identifier and the first reusable watermark identifier of the third machine-readable watermark.

6. The storage medium of claim 1, wherein the instructions to recognize the first machine-readable watermark based on the first barcode comprise instructions to:
determine a watermark position in the first image of the first machine-readable watermark based on a barcode position of the first barcode, wherein a first edge of the first barcode is adjacent to a first edge of the first machine-readable watermark.

7. The storage medium of claim 6,
wherein the first barcode comprises a first border, and wherein an edge of the first border is adjacent to the first edge of the first machine-readable watermark.

8. The storage medium of claim 7,
wherein the first barcode comprises a second border, wherein the first border and the second border form a perpendicular angle, and
wherein a second edge of the first machine-readable watermark is adjacent to a second edge of the second border.

9. A method for recognizing embedded information in images, the method performed by a computing device comprising instructions stored in a non-transitory machine readable storage medium and a processor to implement the instructions, the method comprising:
decoding a first barcode of a first image to obtain a first group identifier;
recognizing a first machine-readable watermark of the first image based on a location of first barcode in the first image;
decoding the first machine-readable watermark; and
obtaining a first payload associated with the first machine-readable watermark based on the first group identifier and a first reusable watermark identifier of the first machine-readable watermark.

10. The method of claim 9, further comprising:
decoding a second barcode of a second image to obtain the first group identifier;
recognizing a second machine-readable watermark of the second image based on a second location of second barcode in the second image;
decoding the second machine-readable watermark; and
obtaining a second payload associated with the second machine-readable watermark based on the first group identifier and a second reusable watermark identifier of the second machine-readable watermark, wherein the second payload is different from the first payload.

11. The method of claim 9, wherein recognizing the first machine-readable watermark based on the location of the first barcode comprises:
determining a watermark position in the first image of the first machine-readable watermark based on the location of the first barcode,
wherein the first barcode comprises a first border comprising an edge adjacent to a first edge of the first machine-readable watermark, and
wherein the first barcode comprises a second border, wherein the first border and the second border form a perpendicular angle, and
wherein a second edge of the first machine-readable watermark is adjacent to a second edge of the second border.

12. A computing device comprising:
a watermark generation engine to generate a first machine-readable watermark, wherein a first machine-readable watermark comprises the first reusable watermark identifier;
a payload association engine to associate the first machine-readable watermark with a first payload based on a first group identifier and the first reusable watermark identifier;
a barcode generation engine to generate a first barcode, wherein the first barcode comprises embedded information comprising the first group identifier; and
an image modification engine to embed the first machine-readable watermark and the first barcode in a first image such that the first machine-readable watermark is adjacent to the first barcode.

13. The computing device of claim 12, wherein the payload association engine is further to:
associate a second machine-readable watermark with a second payload based on a second group identifier and the first reusable watermark identifier, and
associate a third machine-readable watermark with a third payload based on the first group identifier and a second reusable watermark identifier.

14. The computing device of claim 12, wherein:
the watermark generation engine is to generate a second machine-readable watermark, the second machine-readable watermark comprising the first reusable watermark identifier;
the payload association engine is to associate a second machine-readable watermark with a second payload based on a second group identifier and the first reusable watermark identifier;
the barcode generation engine is to generate a second barcode, wherein the second barcode comprises embedded information comprising the second group identifier and the first reusable watermark identifier; and
the image modification engine is to embed the second machine-readable watermark and the second barcode in the first image such that the second machine-readable watermark is adjacent to the second barcode.

15. The computing device of claim 12, further comprising:
a payload determination engine to:
receive, from a second computing device different from the first computing device, a request for the first payload, the request comprising the first group identifier and the first reusable watermark identifier;
determine the first payload based on the request; and
provide the payload to the second computing device.

16. The computing device of claim 12, wherein the image modification engine is to embed the first machine-readable watermark and the first barcode in the first image such that the first machine-readable watermark is adjacent to the first barcode by:
determining a watermark position in the first image of the first machine-readable watermark;
determining a barcode position in the first image of the first barcode based on the first position of the first machine-readable watermark; and
embedding the first machine-readable watermark at the determined watermark position and the first barcode at the barcode position in the first image,
wherein the first barcode comprises a first border and a second border that form a perpendicular angle,
wherein the first border comprises an edge adjacent to a first edge of the first machine-readable watermark, and
wherein a second edge of the first machine-readable watermark is adjacent to a second edge of the second border.

17. A method for embedding information in images, the method performed by a computing device comprising instructions stored in a non-transitory machine readable storage medium and a processor to implement the instructions, the method comprising:
generating a first machine-readable watermark, the first machine-readable watermark comprising a first reusable watermark identifier;
associating the first machine-readable watermark with a first payload based on a first group identifier and the first reusable watermark identifier;
generating a first barcode, wherein the first barcode comprises embedded information comprising the first group identifier; and
embedding the first machine-readable watermark and the first barcode into a first image such that the first machine-readable watermark and the first barcode share a first edge.

18. The method of claim 17, further comprising:
generating a second machine-readable watermark, the second machine-readable watermark comprising the first reusable watermark identifier;
associating the second machine-readable watermark with a second payload based on a second group identifier and the first reusable watermark identifier;
generating a second barcode, wherein the second barcode comprises second embedded information comprising the second group identifier; and
embedding the second machine-readable watermark and the second barcode into the first image such that the second machine-readable watermark and the second barcode share an edge.

19. The method of claim 17, wherein recognizing the first machine-readable watermark based on the location of the first barcode comprises:
determining a barcode position of the first barcode in the first image;
determining a watermark position in the first image of the first machine-readable watermark based on the barcode position of the first barcode,
wherein the first barcode comprises a first border comprising the first edge, and
wherein the first barcode comprises a second border, wherein the first border and the second border form a perpendicular angle, and
wherein the first machine-readable watermark shares a second edge with the second border.

20. The method of claim 17, further comprising:
receiving a plurality of watermark identifiers from a third party computing device; and
storing, in the machine-readable storage medium, the plurality of watermark identifiers as a plurality of reusable watermark identifiers, the plurality of reusable watermark identifiers comprising the first reusable watermark identifier.

* * * * *